July 29, 1941.　　　J. H. FRIEDMAN　　　2,250,629
NONREPEAT VALVE
Filed Dec. 12, 1938　　　3 Sheets-Sheet 1

INVENTOR.
John H. Friedman.
BY Richey & Watts
ATTORNEYS.

July 29, 1941.  J. H. FRIEDMAN  2,250,629
NONREPEAT VALVE
Filed Dec. 12, 1938  3 Sheets-Sheet 2

INVENTOR.
John H. Friedman.
Richey & Watts
ATTORNEYS.

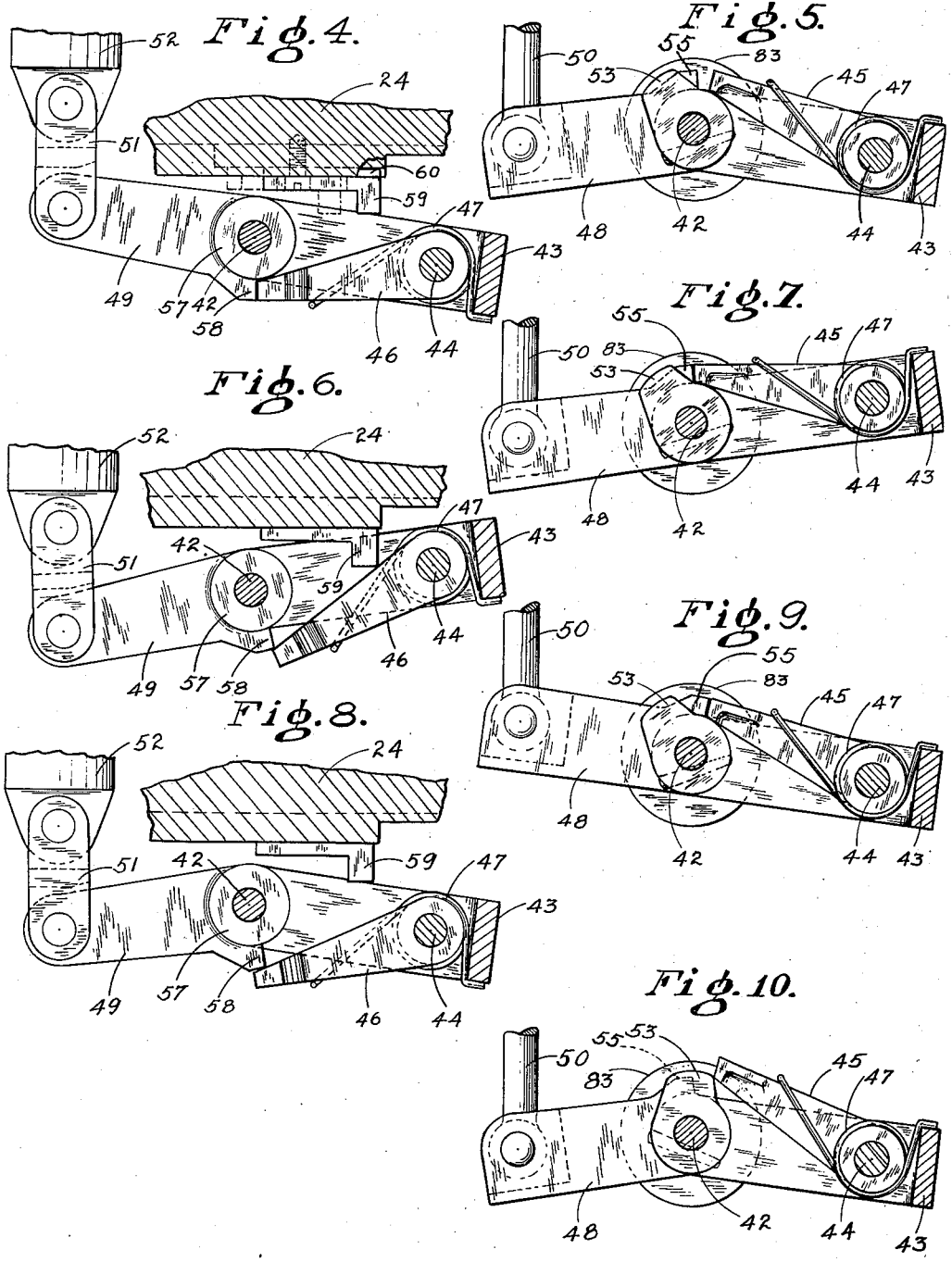

Patented July 29, 1941

2,250,629

UNITED STATES PATENT OFFICE 2,250,629

NONREPEAT VALVE

John H. Friedman, Tiffin, Ohio, assignor to The National Machinery Company, Tiffin, Ohio, a corporation of Ohio Application December 12, 1938, Serial No. 245,101

36 Claims. (Cl. 192—144)

This invention relates to control valves and the like, and more particularly to a valve mechanism arranged to be opened by a manual manipulation and closed automatically to complete a single cycle of a device being controlled.

The principal object of this invention is to prevent repetition of a valve controlled cycle in the event the control member moved to initiate the cycle has not been returned to its normal position at the time the cycle is completed.

Other objects are to provide a control valve mechanism for two different pressure fluid operated devices such as the clutch and brake of a forging machine, press, or the like, in which the opening of the valves occurs in rapid succession but with a definite timed relation so as to insure that the first device is operated before pressure fluid is admitted to the second, while the valves are closed automatically at more widely separated intervals; to arrange the control mechanism for a clutch and brake of a forging machine, press or the like so as to minimize the energy that must be absorbed by the brake in bringing the parts to rest while permitting a relatively high speed of operation through the working part of the cycle; to provide a simple and convenient means for operating the main control valve manually at any desired time without regard to the position of the automatic valve control mechanism; and to provide a simple, durable and reliable non-repeating control valve mechanism.

Other objects and advantages will appear in the following description of a preferred embodiment of the invention.

In the accompanying drawings:

Figure 4 is a sectional view of certain of the control members taken on the line 4—4 of Figure 3 with parts omitted for clarity;

Figure 5 is a similar section taken on the line 5—5 of Figure 3 showing the control members omitted from Figure 4;

Figures 6 and 8 are views corresponding to Figure 4 showing the same parts in different positions;

Figures 7 and 9 are views corresponding to Figure 5 showing the parts in Figure 5 in different positions, the position of Figure 7 corresponding to the position of Figure 6 and the position of Figure 9 corresponding to the position of Figure 8;

Figure 10 is a view similar to Figure 5 showing the parts in position for manual control of the valves.

Figure 1:
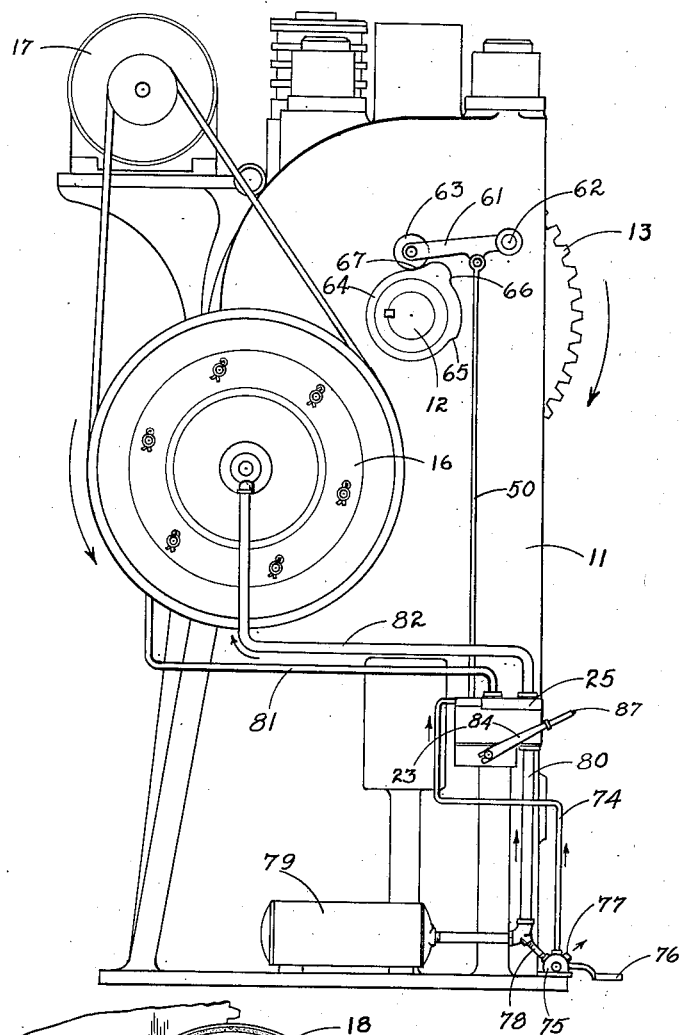
Figure 1 is a side elevation of a forging press showing the valve mechanism of this invention applied to control a fluid actuated clutch and brake.

For the purpose of illustration the invention is shown applied to a forging press of the general type shown in the patent to Clouse No. 2,017,784 and the copending application of Larkin R. Williamson, Serial No. 229,460, filed September 12, 1938. The press consists generally of a main frame 11 in which is journalled a crank or eccentric shaft 12 which carries a pitman connected to a vertically reciprocable header slide (not shown). The crankshaft is provided at one end with a main drive gear 13 meshing with a pinion 14 upon one end of a driven shaft 15, the opposite end of which supports a combined flywheel and fluid actuated friction clutch 16. A motor 17 is belted to the flywheel 16 to continuously rotate the latter. Thus the pinion shaft 15, the crankshaft 12 and the header slide constitute the driven parts of the machine which may be coupled with the continuously rotating flywheel by actuation of the friction clutch. A brake is also provided to stop the rotation of the driven parts when the clutch is released and this may be combined with the pinion 14 in the manner disclosed in the patent to Clouse No. 2,109,940. The brake preferably includes a brake band 18 applied to a drum 19 by means of a spring 20 and released by means of a fluid pressure actuated piston 21 in a cylinder 22. The combined flywheel and fluid actuated friction clutch may be constructed as disclosed in the application of Clouse, Serial No. 31,251, filed July 13, 1935. In the illustrated embodiment the clutch and brake are actuated by compressed air, and the term "fluid" is used herein to designate either a gaseous or liquid medium.

It will be understood that the invention is also applicable to a forging machine provided with a fluid actuated friction clutch and brake as disclosed in the said application of Clouse, Serial No. 64,530, filed February 18, 1936, and in its broader aspects is also generally applicable to many other types of machines to control one or more fluid actuated elements.

The control valve unit is housed in a casing 23 supported in any suitable way on the frame of the machine and formed with a bottom plate 24 and a cover 25. As illustrated two control valves 26 and 27, each of which is a three-way sleeve type compressed air valve, are positioned within the casing 23. Any desired type of valve may be used and as will appear more clearly hereinafter any desired number of valves may be operated. Each of the valves 26 and 27 includes a central tubular member 28 which has its ends seated in opposed rabbets in the lower surface of the cover 25 and the upper surface of the bottom plate 24 and which is firmly clamped in position when the cover 25 is secured to the casing 23. A cored-out passage 29 is formed in the bottom wall 24 of the casing 23 extending from one side to the other thereof and around a central boss 30. Each of the tubular members 28 of the valves has its lower end opening directly into the passage 29. The upper end of the tubular member of the valve 26 opens into a passage 31 formed through the cover plate 25, and the upper end of the tubular member of the valve 27 opens into a passage 32 formed through the cover plate 25. Each of the tubular members 21 is provided with a central partition 33 and series of ports 34 and 35 above and below the partition respectively. The interior of the casing 23 is open to atmosphere through an exhaust port 36.

Figure 2:
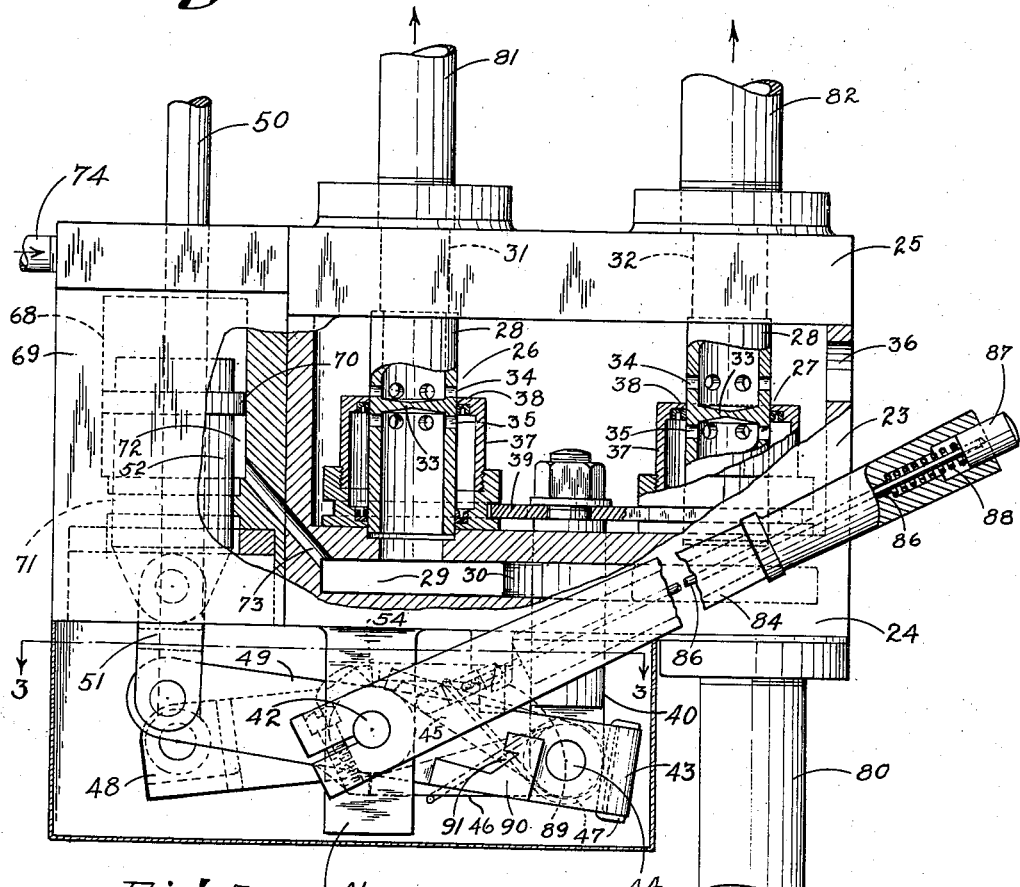
Figure 2 is a side elevation of the control valve assembly with parts broken away to show the interior construction.

A valve sleeve 37 surrounds each of the tubular members 28. Each sleeve 37 has its central portion spaced from the tubular member on which it is mounted and is provided with end walls 38 carrying suitable packing engaging the tubular member to prevent escape of pressure fluid. The sleeves 37 in their lowermost positions as illustrated in Figure 2 cover and close the ports 35 in the lower portions of the tubular members 28, leaving the ports 34 open to the interior of the casing 23 and thus to atmosphere through the port 36. When the two sleeves are moved upwardly to their uppermost positions they span the partitions 33 and establish communication between the ports 34 and 35 of each valve. The two sleeves 37 are connected together by a yoke or the like 39 secured to the upper end of an operating rod 40, which is slidably supported in an opening in the central boss 30 in the bottom plate 24. As shown the ports 34 in the valve 27 are spaced farther from the partition 33 than are the ports 34 in the valve 26, so that the valves 26 and 27 are operated at different points in the vertical movement of the control rod 40.

Mechanism is provided to move the control rod 40 upwardly to open the valves 26 and 27 in succession and initiate a cycle of operation and to automatically return the valves to closed position at the desired times, arranged so that the cycle will not be repeated until the starting mechanism is returned to its original position and the starting operation again performed. In the illustrated embodiment a pair of supports 41 extend downwardly from the bottom plate 24 and are formed with openings in which is journalled a rod 42. A U-shaped link 43 has its free ends perforated and journalled upon the rod 42 between the supporting members 41. A pin 44 is secured in the opposite sides of the U-shaped link 43 and is spaced from the rod 42. The pin 44 fits loosely in a hole in the lower end of the control rod 40 so that oscillation of the U-shaped link 43 about the rod 42 causes vertical reciprocation of the control rod 40 and the valve sleeves 37 connected therewith. A pair of pawls 45 and 46 are also pivoted upon the pin 44 and each is provided with a spring 47 urging its free end inwardly toward the rod 42.

Levers 48 and 49 are pivotally supported upon the rod 42 between the ends of the U-shaped link 43, the lever 48 being aligned with the pawl 45 and the lever 49 being aligned with the pawl 46. The free end of the lever 48 is pivotally connected to a rod 50 which extends upwardly and is controlled by a cam on the machine as will be explained more in detail hereinafter. The free end of the lever 49 is pivotally connected to a link 51 which in turn is pivoted to an actuating piston 52. A cam 53 is secured to the rod 42 between the levers 48 and 49.

Figure 3:
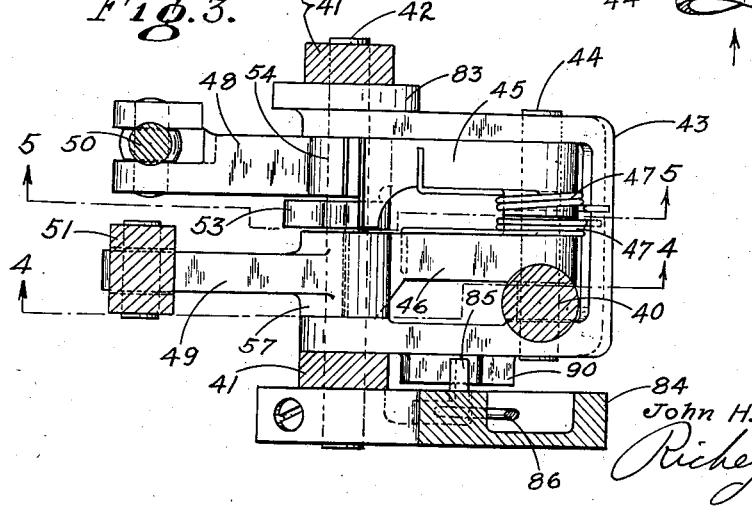
Figure 3 is a view of the operating levers taken substantially on the plane indicated by the line 3—3 of Figure 2, looking in the direction of the arrows.

The lever 48 is formed with a substantially cylindrical boss 54 surrounding the rod 42 and formed with an upwardly projecting abutment shoulder 55. The free end of the pawl 45 normally rests upon the upper side of the cylindrical boss 54 and is pressed thereagainst by its spring 47. The end of the pawl 45 faces the shoulder 55 and is arranged to contact the same when the lever 48 and the link 43 are aligned, as shown in Figures 7 and 9, and to be spaced therefrom when both the lever 48 and the link 43 are depressed as illustrated in Figure 5. Thus when the lever 48 and the link 43 are in the position illustrated in Figure 7 the upward movement of the lever 48 causes downward movement of the link 43 to the position shown in Figure 9, and thereafter downward movement of the lever 48 may take place without affecting the position of the link 43. The free end of the pawl 45 is also extended laterally past the boss 54 of the lever 48 into position to be engaged by the cam 53, as illustrated in Figure 3.

The lever 49 is similarly formed with a substantially cylindrical boss 57 surrounding the rod 42 and having a downwardly projecting abutment shoulder 58. The free end of the pawl 46 normally rests upon the boss 57 and is urged upwardly thereagainst by its spring 47. The end of the pawl 46 is positioned to engage the abutment shoulder 58 when the lever 49 and the link 43 are in alignment.

A lug 59 is supported upon the lower side of the bottom plate 24 and projects downwardly in alignment with the pawl 46. Preferably the lug 59 is supported upon a slide 60 mounted in ways formed on the bottom plate 24 so that the lug 59 is slidable toward and away from the rod 42 and may occupy either the full line position or the dotted line position shown in Figure 4. Any suitable handle or manipulating means may be provided for moving the lug 59 from one position to the other. In normal operation the lug 59 is positioned as shown in full lines in Figure 4 and in this position is arranged to engage the pawl 46 when the lever 49 is forced downwardly and the link 43 has thereby been moved upwardly to open both of the valves 26 and 27. After the link 43 has moved the valves to their uppermost position the lug 59 engages the pawl 46 and further downward movement of the lever 49 causes the end of the pawl 46 to be pushed downwardly out of engagement with the abutment shoulder 58, as illustrated in Figure 6. In this position the end of the pawl 46 is below the shoulder 58 so that the link 43 may be moved downwardly to the position shown in Figure 8 without corresponding movement of the lever 49.

The rod 50 pivotally connected to the lever 48 is carried upwardly in the illustrated embodiment and pivoted to a lever 61 which is pivotally supported at 62 upon the frame 11 of the machine. The end of the lever 61 carries a roller 63 arranged to engage a cam 64 secured to the adjacent end of the crankshaft 12. The cam 64 is provided with a lift portion 65 followed by a dwell, a second lift portion 66, and a drop 67 equal to the sum of the two lifts 65 and 66 and returning to the base circle of the cam. With the parts in the stationary position ready for a cycle of operation to be initiated the roller 63 is resting upon the base circle of the cam 64 as shown in Figure 5, the crankshaft 12 in this position holding the header slide at its upper dead center position.

The actuating piston 52 is reciprocably mounted in a cylinder 68 formed in a housing 69 secured to the side of the valve casing 23. The piston 52 carries a sealing ring 70 engaging the bore of the cylinder 68 and projects downwardly through the lower end of the housing 69 past a sealing land 71 formed at the lower end of the cylinder 68. A space 72 is thereby formed below the sealing ring 70 and above the sealing land 71 which is of substantially less area than the area of the upper end of the piston 52. A duct 73 opening out of the passage 29 extends through the casing 23 and the side of the housing 69 and opens into the space 72 so that the fluid pressure existing in the passage 29 is maintained at all times in the space 72 tending to urge the piston 52 upwardly.

A pipe 74 opens into the upper end of the cylinder 68 above the piston 52 and extends to one port of a foot treadle valve 75. The valve 75 may be any conventional form of three-way valve having a treadle 76 and arranged, when the treadle is released, to connect the pipe 74 with an exhaust port 77, and, when the treadle 76 is depressed, to connect the pipe 74 with a pressure fluid supply pipe 78. The pipe 78 extends to a reservoir 79 or other suitable source of fluid under pressure.

A pipe 80 is secured to the valve casing 23 and opens into the passage 29 formed in the bottom wall 24 and also communicates with the reservoir 79 or other source of supply of fluid pressure. A pipe 81 is secured to the cover 25 communicating with the passage 31 formed therein and leading to the brake releasing cylinder 22. A pipe 82 is similarly secured to the cover 25 communicating with the passage 32 and leading through a central connection to the actuating cylinder of the fluid actuated clutch 16.

When the foot treadle 76 is released the valve 75 maintains the pipe 74 open to atmosphere through the port 77 so that atmospheric pressure is placed on the top of the piston 52 in the cylinder 68. Fluid pressure from the pipe 80 is present in the passage 29 and is maintained in the space 72 by the duct 73 so that the piston 45 is maintained at the upper end of its stroke, thereby holding the lever 49 in the position shown in Figures 2 and 4. The driven parts being stationary, the roller 63 rests on the base circle of the cam as illustrated in Figure 1, and the link 43 and the levers 48 and 49 occupy the positions shown in Figures 4 and 5. The link 43 being in its lowermost position, both of the valves 26 and 27 are closed, as shown in Figure 2. As a consequence both of the pipes 81 and 82 are open to atmosphere through the ports 34 of the two valves and the exhaust port 36 so that the clutch is released and the brake is maintained engaged by its spring 20.

When the treadle 76 is depressed, fluid pressure from the pipe 78 is admitted through the pipe 74 to the cylinder 68, forcing the piston 52 downwardly. As the lever 49 is moved downwardly by the motion of the piston the abutment 58 engaging the pawl 46 forces the link 43 upwardly to open the valves 26 and 27 in quick succession. As the link 43 reaches the upper limit of its motion, the pawl 46 engages the lug 59 so that the pawl 46 is forced out of engagement with the abutment 58, and at the end of the downward motion of the piston 52 the parts occupy the positions shown in Figures 6 and 7.

During the downward movement of the piston 52 the valve 26 is first opened, admitting fluid under pressure to the pipe 81 and thence to the brake cylinder 22, releasing the brake against the tension of the spring 20. After an interval just sufficient to permit full release of the brake, the valve 27 is opened, admitting fluid under pressure through the pipe 82 to the friction clutch 16 so as to engage the same and start the driven parts of the machine in operation. The crankshaft 12 is thereby rotated in the direction indicated by the arrow in Figure 1 carrying the header slide downwardly on its working stroke. After the slide has passed its bottom dead center position and the driven parts have acquired sufficient momentum to complete the return stroke, the lift portion 65 of the cam 64 engages the roller 63 and rocks the lever 48 upwardly a sufficient distance to close the valve 27 while leaving the valve 26 open. At this time the lever 48 and the link 43 occupy a position about midway between the positions shown in Figures 7 and 9.

After the clutch is released the driven parts coast by momentum until the second lift portion 66 of the cam 64 engages the roller 63 and moves the lever 48 and link 43 to the position shown in Figure 9, closing the valve 26 and thereby exhausting the cylinder 22 to atmosphere. The spring 20 then applies the brake and while the driven parts are being brought to rest the crankshaft 12 moves just far enough to carry the drop 67 of the cam past the roller 63, permitting the lever 48 to move to its lowermost position. When the roller 63 has just been engaged by the lift portion 66, the parts occupy the position shown in Figures 8 and 9, assuming that the pressure admitted by the valve 75 is still maintained on the top of the piston 52 so that the lever 49 is maintained in its lowermost position.

It will thus be apparent that the closing of the valves by the operation of the cam 64 takes place wholly independently of the position of the lever 49 controlled by the piston 52 so that no matter when the operator releases the treadle 76 the parts go through their intended cycle of operations and are brought to a stop. Thereafter it is necessary for the operator to first release the treadle 76 so as to exhaust the pressure in the cylinder 68 and permit the piston 52 to be raised to its uppermost position, at which time the pawl 46 snaps into its position behind the abutment 58 as shown in Figure 4, after which the cycle of operations may be repeated by again depressing the treadle 76.

In order to avoid any possibility of the link 43 and valve sleeves 37 being carried by momentum past their intended positions at any time, a friction disc 83 is preferably mounted upon the rod 42 between one of the supports 41 and the adjacent pivoted end of the U-shaped link 43. This friction member is arranged to frictionally engage both the support 41 and the link 43 so as to prevent any overrunning of the link 43 and maintain it in the position to which it is moved by the levers 48 and 49.

The lug 59 is arranged so that it may be moved to the dotted line position shown in Figure 4 by any suitable handle or the like so that it will not engage the pawl 46 and the press or other mechanism may then be operated continuously by simply holding down the treadle 76.

To permit manual actuation of the valves independently of the automatic control a handle 84 is secured to the projecting end of the rod 42. The handle is formed with an axially slidable latch 85 which is connected to a rod 86 terminating in a push button 87 normally held in its outermost position by a spring 88. A lug 89 depending from the underside of the bottom plate 24 is formed with a latch receiving recess arranged to receive the latch 85 and hold the handle 84 in its raised position as shown in Figure 2. The adjacent side of the U-shaped link 43 is likewise formed with a boss 90 having a latch receiving recess 91. When it is desired to operate the valves manually the push button 87 is depressed and the handle 84 swung downwardly until the latch 85 snaps into engagement with the recess 91 in the boss 90. The handle 84 is thereby latched to the link 43 so that upward and downward swinging movement of the handle 84 causes corresponding movement of the link 43 and the valve sleeves 37 connected therewith.

In order to prevent the cam 64 automatically moving the valves when the same are being controlled manually the cam 53 secured to the rod 42 is turned to the position illustrated in Figure 10 when the handle 84 is swung downwardly and latched to the link 43. The cam 53 thereby engages the lateral extension of the end of the pawl 45 and lifts the same out of alignment with the abutment 55 on the lever 48. Upward or downward movement of the lever 48 in accordance with the position of the cam 64 is thereby ineffective to move the link 43 so that the position of the valves is controlled solely by the handle 84.

Although the preferred embodiment of the invention has been described in considerable detail, it is to be understood that many modifications and re-arrangements of parts may be resorted to without departing from the scope of the invention as defined in the following claims.

I claim:

1. In combination, an intermittently operated fluid actuated device, a supply of fluid under pressure, a valve for controlling the admission of fluid from said supply to said device, manually controlled means arranged to be moved in one direction to open said valve and admit pressure fluid from said supply to said device and automatic means controlled by the operation of said device operable to move said valve to closed position before said manually controlled means has been returned to its initial position.

2. In combination, an intermittently operated fluid actuated device, a supply of fluid under pressure, a valve for controlling the admission of fluid from said supply to said device, a fluid actuated piston arranged to move said valve to open position, manually controlled means for admitting fluid to said piston to open said valve, and automatic means controlled by the operation of said device operable to close said valve while pressure is maintained on said fluid actuated piston.

3. In combination, an intermittently operated fluid actuated device, a supply of fluid under pressure, a valve for controlling the admission of pressure fluid from said supply to said device, manually controlled means for moving said valve to open position to admit pressure fluid to said device, automatic means controlled by said device for moving said valve to closed position without affecting the position of said manually controlled means, said manually controlled means being operable to again move said valve only after said manually controlled means has been returned to its initial position.

4. In combination, an intermittently operated fluid actuated device, a supply of fluid under pressure, a valve for controlling the admission of fluid from said supply to said device, manually controlled means operatively connected to said valve arranged to be moved in one direction to open said valve and means automatically disconnecting said first named means from said valve at the end of its valve opening movement.

5. In combination with a machine having a driven shaft, a driving member, a fluid actuated friction clutch for coupling said driving member to said driven shaft, a valve for controlling the admission of pressure fluid to said clutch, a manually controlled member operatively connected to said valve to move the same to open position, means automatically disconnecting said member from said valve at the end of the opening movement thereof and automatic means for closing said valve after a predetermined rotation of said driven shaft.

6. In combination with a machine having a driven shaft, a driving member, a fluid actuated friction clutch for coupling said driving member to said driven shaft, a valve for controlling the admission of pressure fluid to said clutch, a fluid actuated piston operatively connected to said valve, means for admitting pressure fluid to said piston to move said valve to open position, means automatically disconnecting said member from said valve near the end of the opening movement thereof, and automatic means for closing said valve after a predetermined rotation of said driven shaft.

7. In combination with a machine having a driven shaft, a driving member, a fluid actuated clutch to couple said driving member to said driven shaft, a supply of fluid under pressure, a valve for controlling the admission of fluid from said supply to said clutch, manually controlled means arranged to be moved in one direction to open said valve and admit fluid pressure from said supply to said clutch, a cam on said driven shaft, and means operated by said cam after a predetermined rotation of said driven shaft to move said valve to closed position irrespective of the position of said manually controlled means.

8. A non-repeating controlling mechanism for an intermittently operated device comprising an actuating member arranged to be moved in one direction to start said device and to be moved in the opposite direction to stop said device, a movable member arranged to engage and force said actuating member in said one direction, means to engage one of said members and move the same out of engagement with the other of said members after said device has been started, and means to move said actuating member in said opposite direction irrespective of the position of said movable member.

9. In combination with an intermittently operated machine having a driven shaft, a driving element and a clutch to couple said driving element to said driven shaft, a non-repeating controlling mechanism for said clutch comprising an actuating member arranged to be moved in one direction to effect engagement of said clutch and to be moved in the opposite direction to effect disengagement of said clutch, a movable member arranged to engage and force said actuating member in said one direction, means to engage one of said members and move the same out of engagement with the other of said members after said clutch has been engaged, and means controlled by the rotation of said driven shaft to move said actuating member in said opposite direction irrespective of the position of said movable member.

10. In combination with an intermittently operated machine having a driven shaft, a driving element and a clutch to couple said driving element to said driven shaft, a non-repeating controlling mechanism for said clutch comprising an oscillating member arranged to be rocked in one direction to effect engagement of said clutch and in the opposite direction to effect disengagement of said clutch, a link pivoted to said oscillating member, a lever arranged to engage said link and move said oscillating member in said one direction, means forcing said link out of engagement with said lever when said clutch has been engaged and means for rocking said oscillating member in said opposite direction irrespective of the position of said lever.

11. A non-repeating controlling mechanism for an intermittently operated device comprising an actuating member arranged to be moved in one direction to start said device and to be moved in the opposite direction to stop said device, a movable member arranged to engage and force said actuating member in said one direction, a fluid actuated piston connected to said movable member, a manually controlled valve for admitting pressure fluid to said piston to move said movable member in said one direction, means to engage one of said members and move the same out of engagement with the other of said members after said device has been started, and means to move said actuating member in said opposite direction irrespective of the position of said movable member.

12. In combination with a machine having a driven shaft, a driving element, a fluid actuated clutch for coupling said driving element to said driven shaft, and a supply of fluid under pressure, a valve controlling the admission of fluid pressure from said supply to said clutch, an operating member for said valve, a movable member arranged to engage and move said operating member to open said valve, means to engage one of said members and move the same out of engagement with the other after said valve has been opened, and means to close said valve after a predetermined rotation of said driven shaft.

13. In combination, a valve, an oscillating member connected to said valve, a link pivoted to said oscillating member, means positioned to engage said link to move said oscillating member in one direction, and means forcing said link out of engagement with said first named means at the end of the movement in one direction.

14. In combination, a valve, an oscillating member connected to said valve to move the same to open and closed positions, a link pivoted to said oscillating member, a lever arranged to engage said link and move said oscillating member in a direction to move said valve from closed to open position, means forcing said link out of engagement with said lever when said lever reaches open position and other means for returning said valve to closed position irrespective of the position of said lever.

15. In combination, a valve, an oscillating member for moving said valve to open and closed positions, a link pivoted to said oscillating member, a valve opening lever arranged to engage said link to move said oscillating member in a direction to open said valve, means for forcing said link out of engagement with said lever at the end of the opening movement, a second link pivoted to said oscillating member, and a valve closing lever arranged to abut said second link to move said oscillating member in a direction to close said valve.

16. In combination, a valve, a pivoted oscillating member connected to said valve to move the same to open and closed positions, a link pivoted to said oscillating member, a valve opening lever pivoted about the same axis as said oscillating member and arranged to engage said link to move said oscillating member in a direction to open said valve, and means for forcing said link out of engagement with said lever at the end of the opening movement thereof.

17. In combination, an intermittently operated fluid actuated device, a supply of fluid under pressure, a valve for controlling the admission of fluid from said supply to said device, an oscillating member connected to said valve, a link pivoted to said oscillating member, means positioned to engage said link to move said oscillating member in one direction, and means forcing said link out of engagement with said first named means at the end of the movement in one direction.

18. In combination, an intermittently operated fluid actuated device, a supply of fluid under pressure, a valve for controlling the admission of fluid from said supply to said device, an oscillating member connected to said valve to move the same to open and closed positions, a link pivoted to said oscillating member, a lever arranged to engage said link and move said oscillating member in a direction to move said valve from closed to open position, means forcing said link out of engagement with said lever when said valve reaches open position and other means for returning said valve to closed position irrespective of the position of said lever.

19. In combination, an intermittently operated fluid actuated device, a supply of fluid under pressure, a valve for controlling the admission of fluid from said supply to said device, an oscillating member for moving said valve to open and closed position, a link pivoted to said oscillating member, a valve opening lever arranged to engage said link to move said oscillating member in a direction to open said valve, means for forcing said link out of engagement with said lever at the end of the opening movement, a second link pivoted to said oscillating member, and a valve closing lever arranged to abut said second link to move said oscillating member in a direction to close said valve.

20. In combination, an intermittently operated fluid actuated device, a supply of fluid under pressure, a valve for controlling the admission of fluid from said supply to said device, a pivoted oscillating member connected to said valve to move the same to open and closed positions, a link pivoted to said oscillating member, a valve opening lever pivoted about the same axis as said oscillating member and arranged to engage said link to move said oscillating member in a direction to open said valve, and means for forcing said link out of engagement with said lever at the end of the opening movement thereof.

21. In combination, an intermittently operated fluid actuated device, a supply of fluid under pressure, a valve for controlling the admission of fluid from said supply to said device, a movable operating member connected to said valve to move the same to open and closed positions, a movable abutment carried by said member, a manually controlled lever arranged to engage said abutment to move said member in a direction to open said valve, means for moving said abutment out of engagement with said lever when said valve has been opened and means controlled by the operation of said device for returning said valve to closed position irrespective of the position of said lever.

22. In combination, an intermittently operated fluid actuated device, a supply of fluid under pressure, a valve for controlling the admission of fluid from said supply to said device, a movable operating member connected to said valve to move the same to open and closed positions, a manually controlled member, means coupling said manually controlled member with said operating member so that movement of said manually controlled member in one direction moves said operating member to open said valve, means uncoupling said manually controlled member and said operating member at the end of the valve opening movement to permit independent movement of said members, and means controlled by the operation of said device for moving said operating member to valve closing position.

23. In combination with an intermittently operated machine having a driven shaft, a driving element and a fluid actuated clutch to couple said driving element with said driven shaft, a supply of fluid under pressure, a valve for controlling the admission of fluid from said supply to said clutch, a movable operating member connected to said valve to move the same to open and closed positions, a movable abutment carried by said member, a manually controlled lever arranged to engage said abutment to move said member in a direction to open said valve, means for moving said abutment out of engagement with said lever when said valve has been opened and means controlled by the operation of said machine for returning said valve to closed position irrespective of the position of said lever.

24. In combination with an intermittently operated machine having a driven shaft, a driving element and a fluid actuated clutch to couple said driving element with said driven shaft, a supply of fluid under pressure, a valve for controlling the admission of fluid from said supply to said clutch, a movable operating member connected to said valve to move the same to open and closed positions, a manually controlled member, means coupling said manually controlled member with said operating member so that movement of said manually controlled member in one direction moves said operating member to open said valve, means uncoupling said manually controlled member and said operating member at the end of the valve opening movement to permit independent movement of said members, and means controlled by the operation of said machine for moving said operating member to valve closing position.

25. In combination, an intermittently operated fluid actuated device, a supply of fluid under pressure, a valve for controlling the admission of fluid from said supply to said device, a fluid actuated piston, means to admit fluid under pressure to said piston to move the same, means coupling said piston with said operating member so that said operating member is moved to open said valve when fluid pressure is admitted to said piston, means uncoupling said piston and said operating member at the end of the valve opening movement to permit independent movement of said member and said piston and means controlled by the operation of said device for moving said operating member to valve closing position.

26. In combination, a driving member, a driven member, a fluid actuated clutch to couple said driving and driven members, a fluid actuated brake on said driven member, valve means for controlling the admission and exhaust of pressure fluid to and from said clutch and said brake, means to move said valve means in opening direction to admit pressure fluid to said brake to release the same and immediately thereafter admit pressure fluid to said clutch to engage the same, and means controlled by said driven member to return said valve means part way to disengage said clutch while maintaining said brake disengaged, and thereafter to return said valve means to its closed position to apply said brake.

27. In combination, a driving member, a driven member, a fluid actuated clutch to couple said driving and driven members, a fluid actuated brake on said driven member, a supply of fluid under pressure, valve means for controlling the flow of pressure fluid from said supply to said clutch and said brake, said valve means having a closed position in which said brake is applied and said clutch is disengaged, an intermediate position in which said brake is released and said clutch is disengaged and an open position in which said brake is released and said clutch is engaged, means to move said valve from its closed position to its open position to release said brake and engage said clutch in rapid succession, cam means on said driven member arranged to move said valve means to intermediate position after a predetermined movement of said driven member, to hold said valve means in intermediate position during a further predetermined movement of the driven member and finally to return said valve means to closed position.

28. In combination, a pair of fluid actuated devices, a supply of fluid under pressure, a valve for controlling the admission of fluid from said supply to said devices, an operating member for said valve, said valve having ports to admit fluid from said supply to one of said devices when said operating member is moved in one direction to an intermediate position and other ports to admit fluid from said supply to the other of said devices when said operating member is moved farther in said direction, and double cam means controlled by the operation of said devices arranged to move said member in the opposite direction to said intermediate position, hold said operating member in such intermediate position and thereafter move said operating member farther in said opposite direction.

29. In combination with an intermittently operated machine having a driven member, a driving member, a fluid actuated clutch to couple said driving and driven members, a fluid actuated brake on said driven member, a supply of fluid under pressure, valve means for controlling the flow of pressure fluid from said supply to said clutch and brake, means for moving said valve means to release said brake and engage said clutch and cam means on said machine effecting movement of said valve means to disengage said clutch after a predetermined operation of said machine, said cam means maintaining said clutch disengaged and said brake released during further predetermined operation of said machine and finally effecting movement of said valve means to apply said brake and stop said driven member at the end of the cycle of the machine.

30. In combination with an intermittently operated machine having a driven shaft, a continuously rotating driving member, a fluid actuated clutch to couple said driving member with said driven shaft, a brake arranged to stop the rotation of said driven shaft, means normally holding said brake applied, a fluid actuated piston to release said brake against the pressure of said means, a supply of fluid under pressure, valve means for controlling the admission and exhaust of fluid pressure to and from said clutch and said fluid actuated piston, means for opening said valve means to admit pressure fluid to said clutch and said fluid actuated piston to release the brake and engage the clutch and thereby initiate a cycle of said machine and cam means on said machine effecting movement of said valve means to exhaust the pressure from said clutch while maintaining the pressure on said piston after a predetermined operation of said machine, said cam means thereafter holding said valve means so as to maintain said clutch disengaged and said brake released during a further predetermined operation of said machine and finally effecting movement of said valve means to exhaust the pressure from said piston to apply the brake and stop said driven shaft at the end of a cycle of the machine.

31. In combination, an intermittently operated fluid actuated device, a supply of fluid under pressure, a valve for controlling the admission of fluid from said supply to said device, a movable operating member for moving said valve to open and closed positions, a valve closing member connected to said device, means coupling said members together so that movement of said valve closing member in one direction moves said operating member in a direction to close said valve, and a handle arranged to be connected to said operating member to permit manual control of said valve, and means uncoupling said valve closing member and said operating member when said handle is connected to said operating member.

32. In combination, an intermittently operated fluid device, a supply of fluid under pressure, a valve for controlling the admission of fluid from said supply to said device, manually controlled means for opening said valve, a member controlled by the operation of said device normally coupled with said valve so as to move the same to closed position after a predetermined operation of said device, a handle arranged to be connected to said valve to permit manual movement thereof to open and closed positions, and means uncoupling said member from said valve when said handle is connected to said valve.

33. In combination, an intermittently operated fluid device, a supply of fluid under pressure, a valve for controlling the admission of fluid from said supply to said device, a shaft, an operating member pivoted on said shaft and connected to said valve to move the same to open and closed positions, a movable abutment pivoted to said operating member, a valve closing lever pivoted on said shaft and arranged to engage said abutment to move said operating member to valve closing position, a handle secured to said shaft, and a cam mounted on said shaft arranged to engage said abutment and move the same out of engagement with said valve closing lever when said handle is turned.

34. In combination, an intermittently operated fluid device, a supply of fluid under pressure, a valve for controlling the admission of fluid from said supply to said device, a movable valve operating member, means controlled by the operation of said device normally coupled to said operating member to move the same to valve closing position after a predetermined operation of said device, a handle arranged to be normally latched in inoperative position, means on said handle and said operating member to latch said handle to said operating member to permit manual control of said valve, and means controlled by said handle for uncoupling said valve closing means from said operating member when said handle is latched to said operating member.

35. In combination, an intermittently operated fluid actuated device, a supply of fluid under pressure, a valve for controlling the admission of fluid from said supply to said device, manually controlled means for opening said valve to initiate a cycle of operation of said device, automatic means controlled by said device normally coupled to said valve to stop said device after a predetermined operation thereof, and manual means arranged to uncouple said valve from said automatic means to permit full manual control thereof at any time.

36. In combination with a machine having a driven shaft, a driving member, a fluid actuated clutch for coupling said driving member with said driven shaft, a fluid actuated brake for said driven shaft, a supply of fluid under pressure, valve means for controlling the admission of pressure fluid from said supply to said clutch and brake, automatic means controlled by said machine normally coupled with said valve for moving the same to disengage said clutch and apply said brake at the completion of a cycle of operation of said machine, and manual means arranged to uncouple said automatic means from said valve to permit full manual control of said valve at any time.

JOHN H. FRIEDMAN.